US012773657B2

(12) United States Patent
Stark et al.

(10) Patent No.: US 12,773,657 B2
(45) Date of Patent: Oct. 27, 2026

(54) FOLDED FILTER MEDIUM

(71) Applicant: MANN+HUMMEL GmbH, Ludwigsburg (DE)

(72) Inventors: Dennis Stark, Mauer (DE); Tatiana Kloft, Ludwigsburg (DE); Andreas Pelz, Kornwestheim (DE); Joachim Stinzendoerfer, Speyer (DE); Andreas Beck, Kirchheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 368 days.

(21) Appl. No.: 18/532,242

(22) Filed: Dec. 7, 2023

(65) Prior Publication Data

US 2024/0100463 A1 Mar. 28, 2024

Related U.S. Application Data

(63) Continuation of application No. PCT/EP2022/061753, filed on May 3, 2022.

(30) Foreign Application Priority Data

Jun. 10, 2021 (DE) ..................... 10 2021 115 022.1

(51) Int. Cl.
*B01D 39/18* (2006.01)
*B01D 46/52* (2006.01)

(52) U.S. Cl.
CPC ........... *B01D 46/522* (2013.01); *B01D 39/18* (2013.01); *B01D 46/523* (2013.01); *B01D 2239/0464* (2013.01)

(58) Field of Classification Search
CPC .... B01D 46/522; B01D 39/18; B01D 46/523; B01D 2239/0464; B01D 63/067;
(Continued)

(56) References Cited

U.S. PATENT DOCUMENTS 3,953,566 A 4/1976 Gore
4,983,434 A * 1/1991 Sassa ........................ B32B 5/26
55/528

(Continued)

FOREIGN PATENT DOCUMENTS

DE 10150073 A1 4/2003
JP 2020148331 A 9/2020

(Continued)

OTHER PUBLICATIONS

Office Action in corresponding German Appln. No. 102021115022.1, Mar. 1, 2023, 9 pages, Germany.

(Continued)

*Primary Examiner* — Madeline Gonzalez

(57) ABSTRACT

A folded filter medium for a filter element is provided with a cellulose substrate impregnated with a phenolic resin and furthermore provided with an ePTFE layer arranged on the cellulose substrate. A filter element with such a filter medium is provided. A filter assembly with a filter element having such a filter medium is also provided. A method for producing such a filter medium includes the steps of impregnating the cellulose substrate with the phenolic resin; applying the ePTFE layer onto the cellulose substrate impregnated with the phenolic resin; folding the cellulose substrate with the ePTFE layer applied thereon; and curing the phenolic resin.

13 Claims, 6 Drawing Sheets

(58) Field of Classification Search
CPC .... B01D 71/10; B01D 69/10; B01D 46/0001; B01D 46/106; B01D 46/71; B01D 71/36; B01D 2239/0478; B01D 2239/0654; B01D 2239/0668; B01D 2239/0681; B01D 2239/083; B01D 2239/10; B01D 39/1692
See application file for complete search history.

(56) References Cited

U.S. PATENT DOCUMENTS

| | | | | |
|---|---|---|---|---|
| 5,609,761 | A | 3/1997 | Franz | |
| 10,343,085 | B2 | 7/2019 | Harp et al. | |
| 11,235,270 | B2 | 2/2022 | Tate et al. | |
| 2006/0016749 | A1 | 1/2006 | Debes et al. | |
| 2008/0245041 | A1 | 10/2008 | Choi | |
| 2008/0302074 | A1* | 12/2008 | Gebert ................. | B01D 46/543 55/524 |
| 2009/0178970 | A1 | 7/2009 | Stanfel et al. | |
| 2009/0221047 | A1 | 9/2009 | Schindler et al. | |
| 2010/0107881 | A1 | 5/2010 | Healey et al. | |
| 2011/0048228 | A1 | 3/2011 | Handley et al. | |
| 2014/0102974 | A1 | 4/2014 | Harp | |
| 2021/0086119 | A1 | 3/2021 | Neef et al. | |

FOREIGN PATENT DOCUMENTS

| | | | |
|---|---|---|---|
| WO | 9517941 | A1 | 7/1995 |
| WO | 2018183481 | A1 | 10/2018 |

OTHER PUBLICATIONS

International Search Report in corresponding International Appln. No. PCT/EP2022/061753, Aug. 19, 2022, Rijswijk, Netherlands.

* cited by examiner

FOLDED FILTER MEDIUM

CROSS-REFERENCE TO RELATED APPLICATIONS

This application is a continuation application of international application No. PCT/EP2022/061753 having an international filing date of 3 May 2022 and designating the United States, the international application claiming a priority date of 10 Jun. 2021 based on prior filed German patent application No. 10 2021 115 022.1, the entire contents of the aforesaid international application and the aforesaid German patent application being incorporated herein by reference.

BACKGROUND OF THE INVENTION

The invention concerns a folded filter medium, a filter element, a filter assembly, a vehicle as well as a manufacturing method for a folded filter medium.

Known folded filter media which are used in particular in air filters of vehicles comprise an inflow side and an outflow side. Dust particles deposit at the inflow side of the filter medium. Due to the deposition of the dust particles, the pressure conditions between the inflow side and the outflow side change in continuing operation such that a pressure loss between them rises. This rise can lead to collapsing or packeting of the folds of the filter medium. As a result, higher filtration speeds (ratio of air volume flow to filter surface) occur in the remaining still open folds than specified by the manufacturer so that the folds will become clogged even faster with dust particles.

In order to counteract the afore described disadvantageous effects, the filter medium either must be replaced or cleaned regularly. Cleaning can be realized by the use of various techniques, for example, shaking, vibrating, beating, flushing, or short reverse flow pressure pulses.

Independent of the technique that is employed for cleaning, it is important that the filter medium can be cleaned easily in order to avoid an irreversible particle deposition. From the prior art, filter elements that can be cleaned easily are known which comprise a cellulose substrate with an ePTFE layer (expanded polytetrafluoroethylene) arranged thereon. The ePTFE layer is positioned normally at the inflow side of the filter medium. It exhibits a minimal adhesive force and therefore a reversible particle deposition so that cleaning of the filter medium is simplified. The cellulose substrate exhibits a high mechanical stability.

It is also known to improve adhesion of the ePTFE layer on the cellulose substrate by an impregnation thereof with thermoplastic resins, also referred to as plastomers. WO 2006/012 495 A1 discloses a filter medium comprising a cellulose substrate impregnated with polyvinyl acetate (PVA) onto which an ePTFE layer is laminated.

A disadvantage of an impregnation of the cellulose substrate with thermoplastic materials is that the thermoplastic materials become softer and therefore easily deformable at higher temperature.

SUMMARY OF THE INVENTION

In view of this background, the object of the invention lies in providing an improved filter medium.

Accordingly, a folded filter medium is proposed which comprises a cellulose substrate with an ePTFE layer arranged thereon. The cellulose substrate is impregnated with phenolic resin.

Herein, a folded filter medium is to be understood as a filter medium comprising folds. The folded filter medium can have various shapes. In particular, the folded filter medium can be embodied to be planar, cylindrical or conical, wherein the cross section of the cylindrical or conical filter medium can be in particular circular or oval.

The cellulose substrate of the folded filter medium ensures the mechanical stability. The cellulose substrate forms the outflow side of the filter medium. The outflow side is the side of the filter medium from which the purified fluid exits.

The ePTFE layer which can be embodied as membrane is arranged at the inflow side of the filter medium on the cellulose substrate. The inflow side of the filter medium is the side through which the fluid to be filtered enters the filter medium. The ePTFE layer comprises a reduced adhesive force in relation to dust particles and a reversible particle deposition.

Advantageously, the cellulose substrate is impregnated with the phenolic resin in the present case.

Phenolic resin is a thermoset polymer, also referred to as thermoset resin or thermoset. After curing, thermosets are no longer deformable by heating. Thus, in contrast to thermoplastics, they are shape-stable even at increased temperatures. Also, the use of the phenolic resin as impregnation agent is particularly suitable, due to its hydrophobic character, for use in a filter medium. The phenolic resin with which the cellulose substrate is impregnated serves also as a binding agent for the ePTFE layer.

After curing of the phenolic resin, the folded filter medium is more shape stable. In this way, the fold collapse is prevented, especially in case of cleaning of the filter medium by the reverse flow principle.

According to an embodiment, the ePTFE layer is laminated onto the cellulose substrate. Lamination is to be understood here as the application of the ePTFE layer onto the cellulose substrate impregnated with phenolic resin by the use of pressure. The lamination can be hot or cold: In case of hot lamination, in addition to pressure also heat is applied in order to improve the adhesion of the ePTFE layer on the cellulose substrate. Due to the lamination, the adhesion of the ePTFE layer on the cellulose substrate is improved.

According to a further embodiment, the filter medium comprises folds each comprising at least one embossment or a fluting. Embossment is to be understood as a modification of the fold surface. This modification can be a (local) elevation or depression in the fold wall. An embossment however can also be an indentation at the fold tip or at the fold base. Embossments advantageously reinforce a fold. A fold can comprise a plurality of embossments.

As an alternative or in addition, the embossments of two neighboring folds can be arranged such that a region between the two folds is defined in which they do not contact each other. In this way, it can be avoided that two neighboring folds collapse onto each other such that no air can flow between them anymore.

According to an embodiment, the embossments of two neighboring folds can be positioned opposite to each other at least partially. In this way, it can be even better prevented that two neighboring folds collapse onto each other.

The embossments can be knobs and/or S embossments and/or pleat lock embossments.

Knobs are elevations on the fold wall. They can have various shapes. For example, they can be round, oval or rectangular.

S embossments are recesses or bulges designed in an S shape which extend from a point shortly below the fold tip down to the fold base.

Knob embossments as well as S embossments are advantageous in that they serve to reinforce the fold wall. Also, knob embossment and/or S embossments can be arranged on two neighboring folds in such a way that the embossments are positioned opposite each other at least partially, in particular such that they define a region in which two neighboring folds do not contact each other.

Pleat lock embossments are indentations at the fold tip or at the fold base. Pleat lock embossments are advantageous in that they can keep apart the fold tips or fold bases of neighboring folds particularly effectively. In this way, collapse of the folds onto each other is avoided particularly effectively. Pleat lock embossments are located preferably at the fold tip.

According to an embodiment, at least one fold comprises at least two pleat lock embossments, wherein between the two pleat lock embossments at least an S embossment or a knob embossment is provided. In this way, the reinforcement of the fold wall as well as avoidance of packeting of the folds can be achieved at the same time.

According to a further embodiment, each fold comprises identical embossments.

According to further aspect, a filter element with an afore described folded filter medium is provided. The filter element comprises at least the filter medium and a seal arrangement for sealing between raw side and clean side. In case of a flat filter element, this can be, for example, a circumferentially extending frame. Preferably, the filter element is embodied as a hollow cylinder or conical. For this purpose, the filter medium is of a closed annular shape, for example, by welding or gluing of the end folds of a filter medium section. End disks for sealing are arranged at the oppositely positioned end faces. The filter element furthermore can comprise an in particular cage-type support tube, wherein the filter medium is arranged around the support tube. Preferably, the outer side forms the inflow side or raw side and the inner side the outflow side or clean side.

The filter element is in particular a filter element for an air filter. The filter element can be an intake air filter.

According to further aspect, a filter assembly is provided. It comprises a housing in which an above described filter element is received. The filter medium of the filter element can be cleaned by the reverse flow principle. For this purpose, means are provided which serve to generate pressure pulses which generate a pressure difference between the outflow side and the inflow side of the filter medium. Due to these pressure pulses, the dust particles which have deposited at the inflow side on the ePTFE layer of the filter medium can be removed therefrom again.

According to a further aspect, a vehicle with a filter element as described above or with a filter assembly as described above is provided. The vehicle is in particular an agricultural commercial vehicle, such as a combine harvester or a tractor. Motor vehicles, trucks, construction vehicles, watercraft or aircraft are also conceivable.

According to a further aspect, a method for producing an afore described filter medium is provided. According to the manufacturing method, first the cellulose substrate is impregnated with a phenolic resin. After impregnation, an ePTFE layer is applied onto the cellulose substrate. The impregnated cellulose substrate with the ePTFE layer applied thereon is then folded. Subsequently, the phenolic resin is cured in order to reinforce the folds of the filter medium and to connect the ePTFE layer to the cellulose substrate. Curing of the phenolic resin is preferably realized by the introduction of heat.

According to an embodiment, between the steps of folding of the cellulose substrate and of curing of the phenolic resin, the embossments are embossed in the folds of the cellulose substrate.

According to a further embodiment, the application of the ePTFE layer onto the cellulose substrate is realized by lamination. The lamination of the ePTFE layer onto the cellulose substrate is realized preferably by the application of pressure and/or heat.

According to an embodiment, the ePTFE layer is first applied onto the cellulose substrate, then the cellulose substrate with the ePTFE layer applied thereon is passed through preheated rolls.

Further advantageous embodiments and aspects of the here disclosed invention are subject matter of the dependent claims as well as of the embodiments disclosed in the Figures.

BRIEF DESCRIPTION OF THE DRAWINGS

In the Figures, same or functionally the same elements are provided with the same reference characters, if nothing else is indicated.

DESCRIPTION OF PREFERRED EMBODIMENTS

Figure 1:
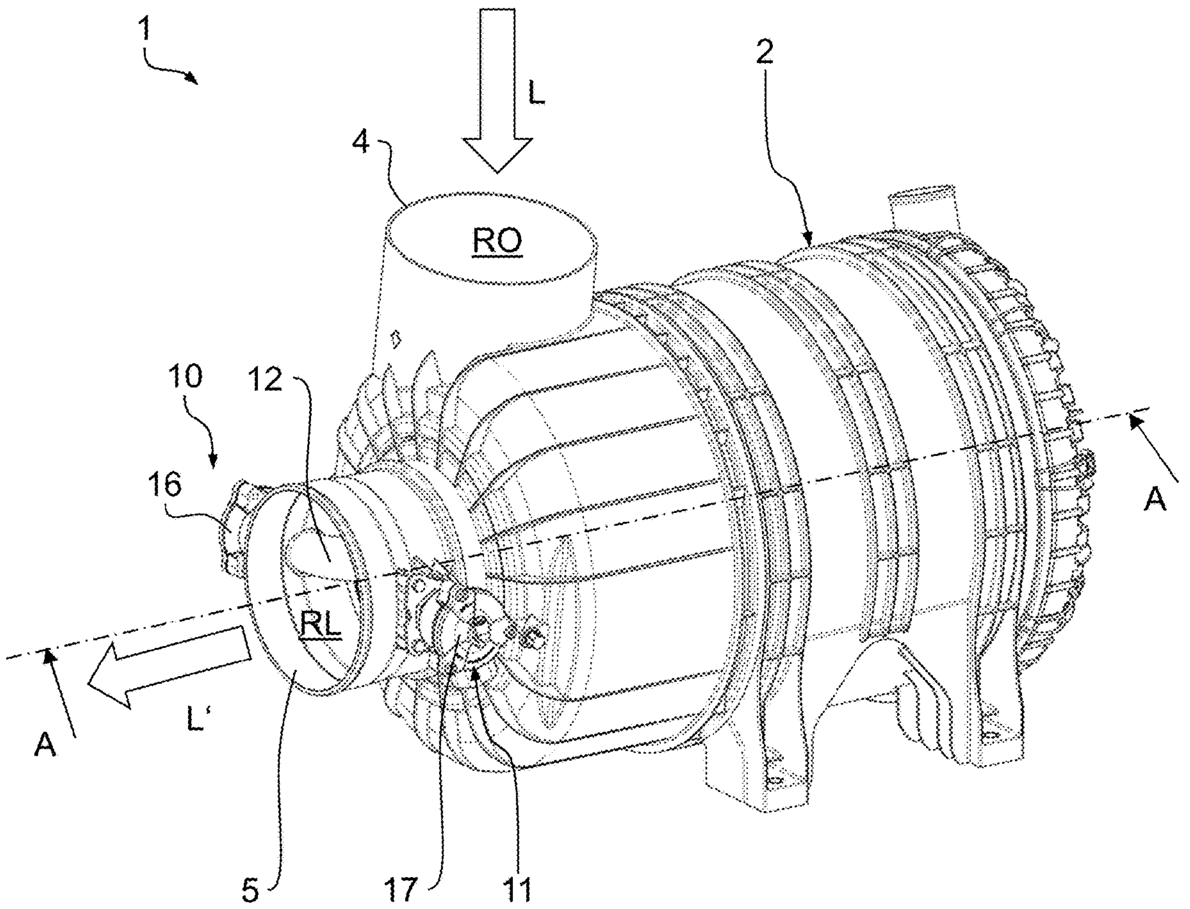
FIG. 1 shows a perspective view of a filter assembly according to an embodiment.

FIG. 1 shows a perspective view of an embodiment of a filter assembly 1. The filter assembly 1 can also be referred to as filter system. It is used as intake air filter in internal combustion engines for agricultural purposes, for example, a combine harvester. The filter assembly 1 comprises a housing 2 in which a filter element 3 is received, as can be seen in FIG. 2.

The housing 2 comprises furthermore a fluid inlet 4 and a fluid outlet 5. The fluid to be filtered, in this case the intake air L, enters the filter assembly 1 through the fluid inlet 4. The intake air L=purified by the filter element 3 exits from the filter assembly 1 through the fluid outlet 5.

Figure 2:
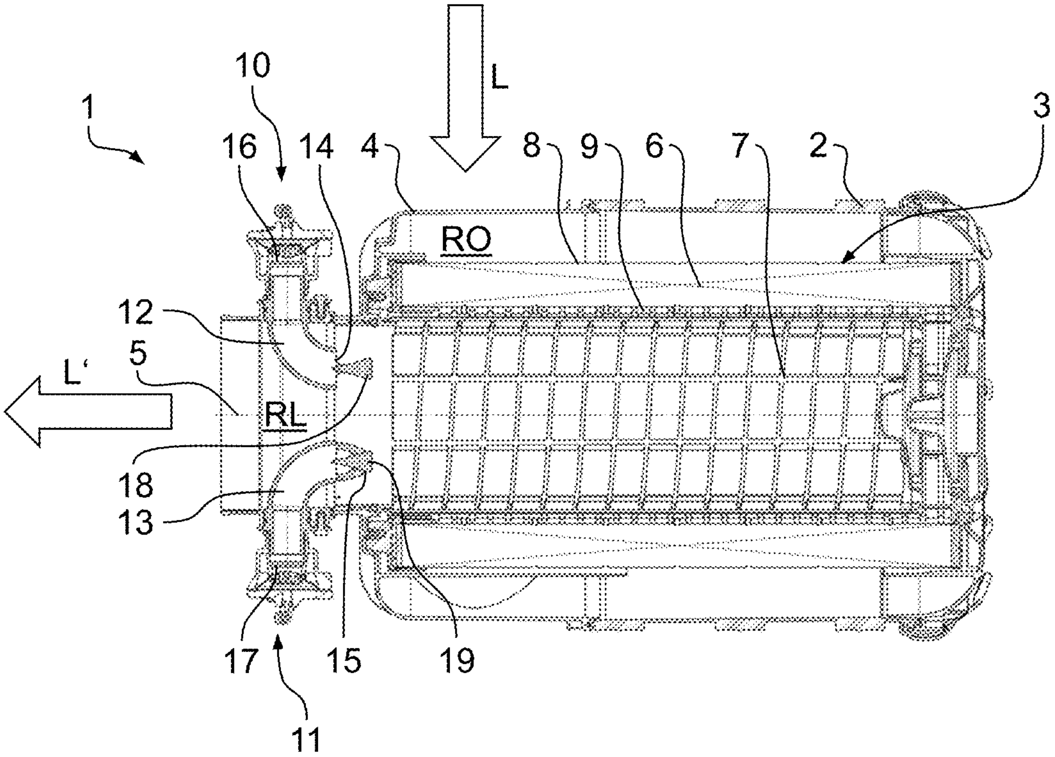
FIG. 2 shows a section along the line A-A of FIG. 1.

As illustrated in FIG. 2, the filter element 3 comprises a folded filter medium 6 surrounding a support tube 7 and contacting it in such a way that the support tube 7 provides a supporting function for the filter medium 6 as flow passes through. The support tube 7 is grid-shaped and thus embodied to be fluid-permeable.

In the embodiment according to FIGS. 1 and 2, the filter element 3, the filter medium 6, and the support tube 7 are embodied of a cylindrical configuration with a circular cross section. However, it is also conceivable that the filter element 3, the filter medium 6, and the support tube 7 comprise a different cross section, for example, an oval cross section, and/or are conically embodied. A planar configuration is possible likewise.

The air L to be filtered passes from a raw side RO of the filter element 3 through the filter medium 6 and exits as purified air L=at a clean side RL of the filter element 3 surrounded by the support tube 7. The raw side RO is in fluid communication with the fluid inlet 4 and the clean side RL with the fluid outlet 5.

The filter medium 6 comprises an inflow side 8 and an outflow side 9. The inflow side 8 is the side of the filter medium 6 which is facing the raw side RO of the filter element 3. The outflow side 9 is the side of the filter medium 6 which is facing the clean side RL of the filter element 3.

The dust particles that are contained in the air L to be filtered are deposited at the inflow side 8 of the filter medium 6 so that the filter medium 6 is loaded. After a certain time, loading of the filter medium 6 is however so high that the pressure loss between its inflow side 8 and outflow side 9 is increased to such an extent that the filter element 3 must be replaced or the filter medium 6 cleaned.

The filter assembly 1 comprises means 10, 11 which serve for cleaning the filter medium 6 by reverse flow principle. The means 10, 11 are pipes 12, 13 which open at ends 14, 15 into the clean side RL of the filter element 3 and, at ends 16, 17 opposite the ends 14, 15, are connectable to a pressure source not illustrated here in detail. Valves 18, 19 are provided at the ends 14, 15 of the pipes 12, 13 for producing pressure pulses.

Figure 3:
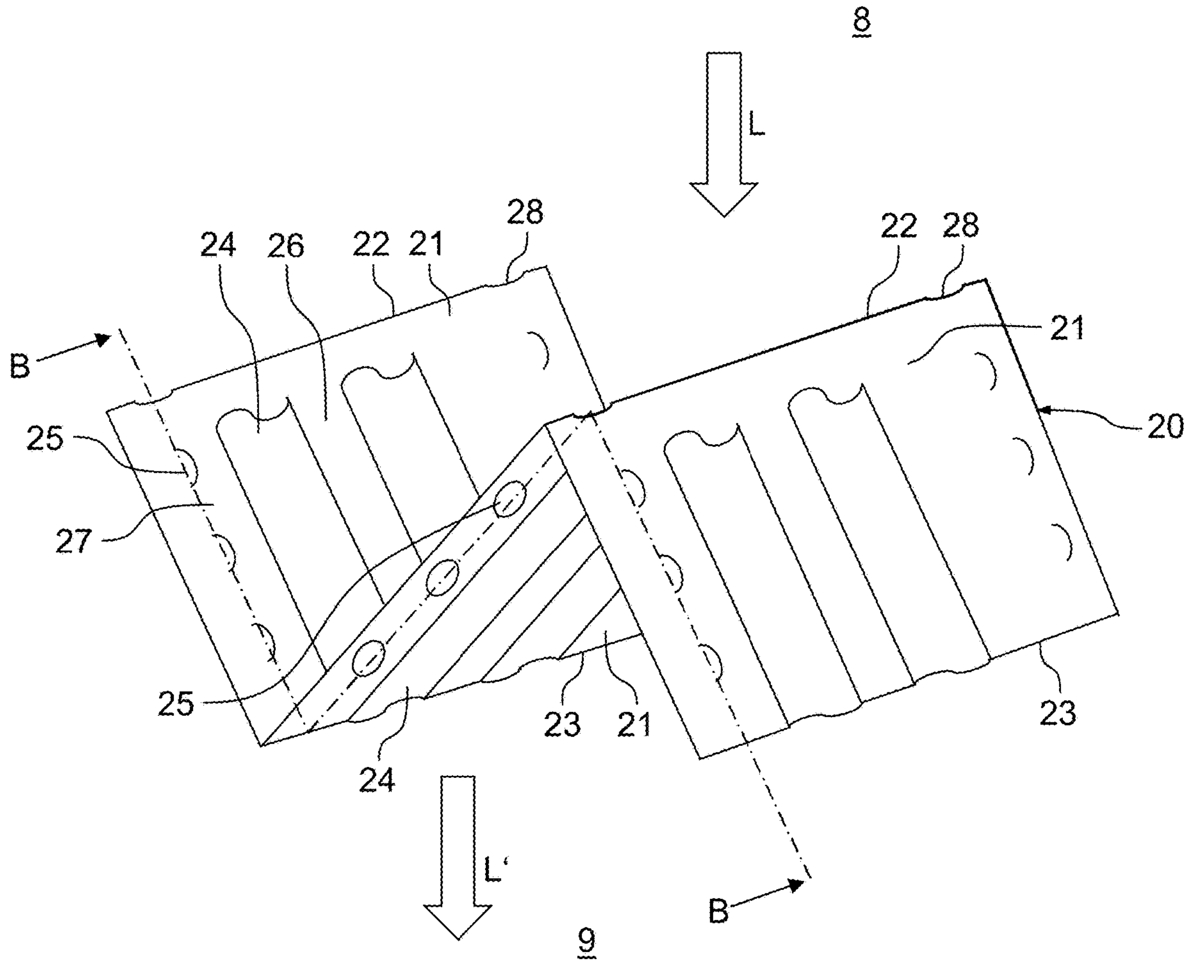
FIG. 3 shows a perspective view of a section of a folded filter medium.

The filter medium 6 is a folded filter medium, as is shown in FIG. 3. It shows a perspective view of a section of the folded filter medium 6 with folds 20, wherein in FIG. 3 only one fold 20 is completely illustrated. Each fold 20 comprises two fold walls 21, wherein respective neighboring fold walls 21 are connected to each other at a common fold tip 22—also referred to as upper fold edge—at the inflow side and at a common fold base 23—also referred to as lower fold edge—at the outflow side.

The fold walls 21 in this embodiment comprise S embossments 24 as well as knob embossments 25.

The S embossments 24 are recesses or bulges which extend from a point shortly below the fold tip 22 down to the fold base 23. A fold wall 21 comprises a plurality of S embossments 24. The S embossments 24 are designed in an S-shape and arranged such that two S embossments 24 arranged at two neighboring fold walls 21 are symmetrically embodied. In this way, a region 26 in which the two fold walls 21 do not contact is defined between the S embossments 24.

The knob embossments 25 are bulges at the inflow side 8 of the fold wall 21. Each of the fold walls 21 comprises a plurality of knob embossments 25. The knob embossments 25 are also arranged such that two knob embossments 25 arranged at two neighboring fold walls 21 are symmetrically embodied. In this way, a region 27 in which the two fold walls 21 do not contact is defined between the knob embossments 25.

At the fold tips 22 of the folds 20, furthermore pleat lock embossments 28 are provided. These are indentations which serve to keep apart the fold tips 22 of neighboring folds 20.

Figure 4:
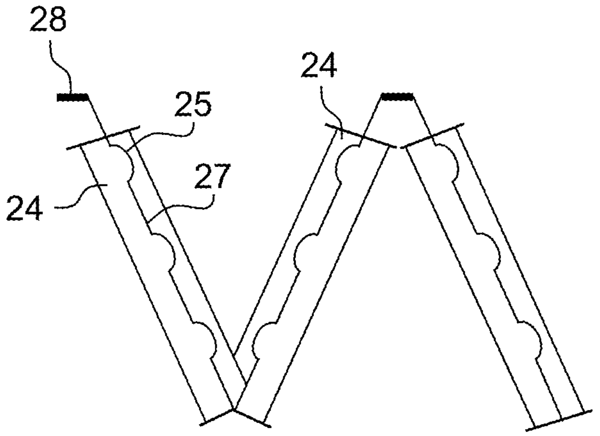
FIG. 4 shows a section along the line B-B of FIG. 3.

FIG. 4 shows a section along the line B-B of FIG. 3. In FIG. 4, the knob embossments 25, S embossments 24, and pleat lock embossments 28 can be seen. Also, the region 27 defined by the oppositely positioned knob embossments 25 of two neighboring fold walls 21 can be seen well in FIG. 4.

Figure 5:
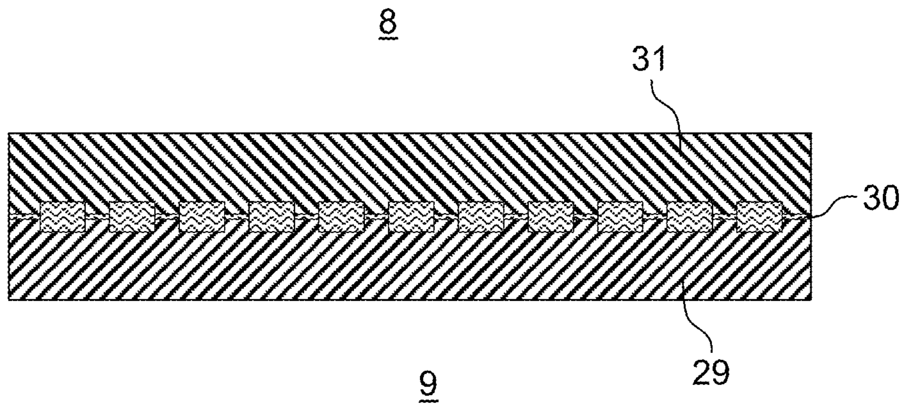
FIG. 5 shows a layer construction of the filter medium.

FIG. 5 shows a layer construction of the filter medium 6. The filter medium 6 comprises a cellulose substrate 29 which is impregnated with a phenolic resin 30 and an ePTFE layer 31 arranged on the cellulose substrate 29.

The cellulose substrate 29 provides for the mechanical stability of the filter medium 6. The cellulose substrate 29 is arranged at the outflow side 9 of the filter medium 6.

The ePTFE layer 31 which can also be applied as a membrane onto the cellulose substrate 29 is arranged at the inflow side 8 of the filter medium 6. The ePTFE layer 31 serves as an upper filtration layer for the filter medium 6, wherein dust particles are deposited thereon. The ePTFE layer 31 comprises in addition a reduced adhesive force and therefore a reversible particle deposition so that cleaning of the filter medium by the reverse flow principle is simplified. The ePTFE layer 31 is laminated onto the cellulose substrate 29 in the present embodiment.

The phenolic resin 30 with which the cellulose substrate 29 is impregnated, serves in addition as a binding agent between the cellulose substrate 29 and the ePTFE layer 31. After curing, the phenolic resin 30 is no longer deformable by heat action. The risk of a fold collapse is reduced in normal operation of the filter assembly 1 as well as in cleaning operation by reverse flow principle.

Figure 6:
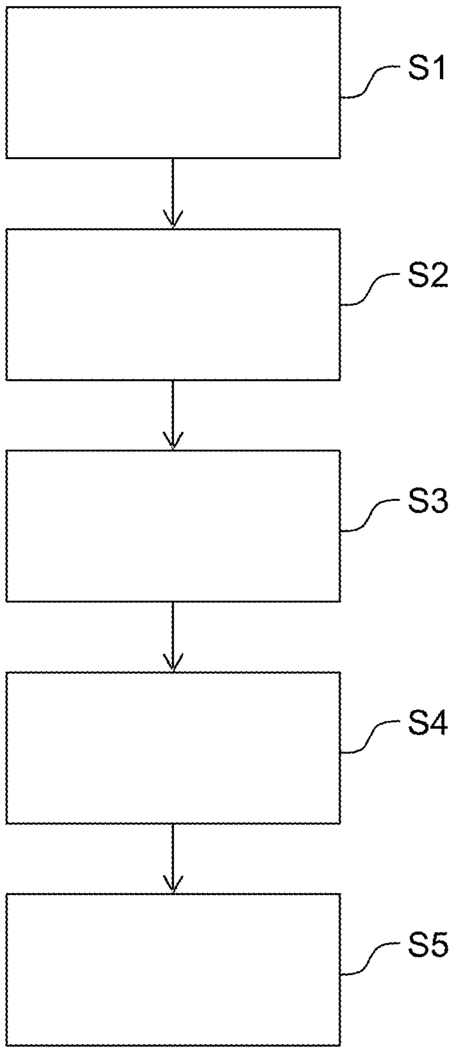
FIG. 6 shows a schematic illustration of a manufacturing method for a filter medium.

FIG. 6 shows schematically a manufacturing method for producing the folded filter medium 6. In a step S1 of the method, a cellulose substrate 29 is impregnated with phenolic resin 30. The phenolic resin 30 is comprised of a mixture of a base component and a curing agent which are provided in weight ratios relative to each other well known to a person of skill in the art.

After the cellulose substrate 29 has been impregnated with phenolic resin 30, the ePTFE layer 31 is arranged on the cellulose substrate 29 (step S2). The ePTFE layer 31 can be arranged by various methods on the cellulose substrate 29.

In particular, lamination is conceivable as a method. In lamination, the ePTFE layer 31 is applied onto the cellulose substrate 29 and the cellulose substrate 29 with the ePTFE layer 31 arranged thereon is then compressed by means of rolls. The rolls can be preheated in order to improve the adhesion of the ePTFE layer 31 on the cellulose substrate 29. In this case, one speaks of hot lamination. When the rolls are not preheated, one speaks of cold lamination.

In step S3 of the method, the cellulose substrate 29 with the ePTFE layer 31 attached thereto is folded.

In step S4 of the method, the folds 20 can be provided with embossments. These are S embossments or knob embossments 24, 25 which are embossed into a fold wall 21 or pleat lock embossments 28 by means of which fold tips 22 are indented.

Finally, the phenolic resin 30 is cured (step S5). Preferably, phenolic resin is cured by the action of heat. Due to curing of the phenolic resin 30, on the one hand, the cellulose substrate 29, thus the filter medium 6, becomes stiffer. On the other hand, the ePTFE layer 31 is connected to the cellulose substrate 29.

For producing a ring-shaped closed filter element, the filter medium can be applied onto a support tube and provided with end disks, wherein the end folds are connected to each other for forming the hollow body.

REFERENCE CHARACTERS

1 filter assembly
2 housing
3 filter element
4 fluid inlet
5 fluid outlet
6 filter medium
7 support tube
8 inflow side

9 outflow side
10, 11 means
12, 13 pipes
14, 15 end
16, 17 opposite end
18, 19 reverse pressure valves
20 fold
21 fold wall
22 fold tip
23 fold base
24 S embossments
25 knob embossments
26, 27 region
28 pleat lock embossment
29 cellulose substrate
30 phenolic resin
31 ePTFE layer
L air
L=purified air
RO raw side
RL clean side
S2 to S5 method steps

What is claimed is:

1. A folded filter medium for a filter element, the folded filter medium comprising:

a cellulose substrate impregnated with a phenolic resin; and an ePTFE layer arranged on the cellulose substrate;

wherein the ePTFE layer is laminated onto the cellulose substrate;

wherein the folded filter medium further comprises a plurality of folds having one or more embossments; and wherein the one or more embossments are selected from the group consisting of knob embossments, S embossments, pleat lock embossments, and combinations thereof; and wherein the plurality of folds includes at least one fold comprising at least two of the pleat lock embossments, wherein at least an S embossment or a knob embossment is provided between the at least two pleat lock embossments.

2. The folded filter medium according to claim 1, wherein the plurality of folds include a first fold and a second fold neighboring each other, wherein the one or more embossments of the first fold and the one or more embossments of the second fold are arranged such that a region is defined between the first fold and the second fold, wherein the first fold and the second fold do not contact each other in the region.

3. The folded filter medium according to claim 2, wherein the one or more embossments of the first folds and the one or more embossments of the second fold are positioned opposite each other at least partially.

4. The folded filter medium according to claim 1, wherein the one or more embossments are configured to reinforce the fold.

5. The folded filter medium according to claim 4, wherein the plurality of folds include a first fold and a second fold neighboring each other, wherein the one or more embossments of the first fold and the one or more embossments of the second fold are arranged such that a region is defined between the first fold and the second fold, wherein the first fold and the second fold do not contact each other in the region.

6. The folded filter medium according to claim 1, wherein each fold comprises identical embossments.

7. A filter element comprising a folded filter medium, wherein the folded filter medium is the folded filter medium of claim 1.

8. A filter assembly comprising:

a housing;

a filter element received in the housing, wherein the filter element comprises a folded filter medium, wherein the folded filter medium is the folded filter medium of claim 1;

wherein the folded filter medium of the filter element is configured to be cleaned by a reverse flow principle.

9. A vehicle comprising a filter element according to claim 7.

10. A vehicle comprising a filter assembly according to claim 8.

11. A method for producing a filter medium according to claim 1, the method comprising:

impregnating the cellulose substrate with the phenolic resin;

applying the ePTFE layer onto the cellulose substrate impregnated with the phenolic resin;

folding the cellulose substrate with the ePTFE layer applied thereon;

embossing embossments in folds of the cellulose substrate after folding the cellulose substrate with the ePTFE layer applied thereon and before curing the phenolic resin; and curing the phenolic resin.

12. The method according to claim 11, wherein applying the ePTFE layer onto the cellulose substrate impregnated with the phenolic resin is done by laminating.

13. The folded filter medium according to claim 1, wherein the pleat lock embossment is an indentation, and wherein the S embossment or the knob embossment includes a bulge.

* * * * *